United States Patent Office 3,781,294
Patented Dec. 25, 1973

3,781,294
CERTAIN DIBENZO[b,f]THIEPIN[4,5-d] IMIDAZOLES
Joseph G. Lombardino, East Lyme, Conn., assignor to Pfizer Inc., New York, N.Y.
No Drawing. Original application Mar. 31, 1971, Ser. No. 129,977, now Patent No. 3,711,489. Divided and this application July 31, 1972, Ser. No. 276,597
Int. Cl. C07d 31/40, 49/36
U.S. Cl. 260—294.8 A          6 Claims

ABSTRACT OF THE DISCLOSURE 2-substituted dibenzo[b,f]thiepin[4,5-d]- and dibenzo-[3,4,7,8]cycloöcta[1,2-d]imidazoles and the pharmaceutically acceptable acid addition salts thereof, a novel class of anti-inflammatory agent.

CROSS REFERENCE TO RELATED APPLICATION

This application is a division of application Ser. No. 129,977, filed Mar. 31, 1971, now U.S. Pat. 3,711,489.

BACKGROUND OF THE INVENTION

This invention relates to tetracyclic imidazoles, and more particularly to a series of 2-substituted dibenzo[b,f]thiepin[4,5-d]- and dibenzo[3,4,7,8]cycloöcta[1,2-d]imidazoles and their pharmaceutically acceptable acid addition salts as a novel class of anti-inflammatory agents. Synthesis of these compounds is achieved through a condensation of the requisite α-diketone, an aldehyde and ammonium acetate.

References directed toward polycyclicimidazoles are not common in the chemical literature; Steck and Day, J. Am. Chem. Soc., 65, 452 (1943), in an effort to determine the course of the reaction involved in imidazole formation synthesized a series of phenanthrimidazoles. No utility, however, was disclosed for these compounds.

SUMMARY OF THE INVENTON

The tetracyclic anti-inflammatory agents of this invention are represented by the formula:

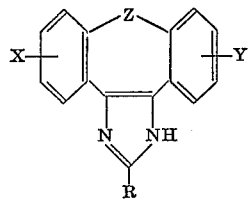

and the pharmaceutically acceptable acid addition salts thereof, where:

A is —CH$_2$CH$_2$— or S;
X and Y are each hydrogen, methyl, methoxy, fluorine, chlorine, bromine or methylthio; and
R is trifluoromethyl, pyridyl, naphthyl or phenyl or substituted phenyl where the substituent is methyl, methoxy, fluorine, chlorine, bromine, dimethylamino, carboxy or methylthio.

Of particular interst are congeners wherein Z is ethylene, X and Y are hydrogen and R is phenyl, 3-pyridyl or trifluoromethyl, and those wherein Z is sulphur, X and Y are hydrogen and R is p-methoxyphenyl, 3-pyridyl, trifluoromethyl or p-carboxyphenyl.

Also included within the scope of the present invention are the sulfoxides and sulfones of those analogs wherein Z is sulphur, congeners wherein R is lower alkyl and, finally, alkylation products of the compounds of the present invention wherein said products are represented by the formulae:

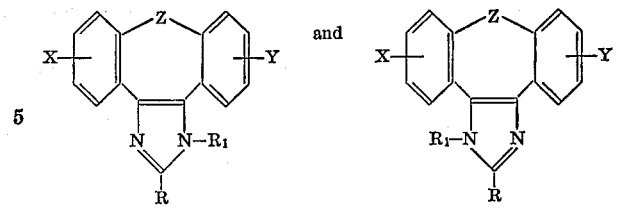

wherein Z, X, Y and R are as previously indicated and R$_1$ is lower alkyl.

DETAILED DESCRIPTION OF THE INVENTION

In accordance with the process for preparing the tetracyclicimidazoles of the present invention of Formula I:

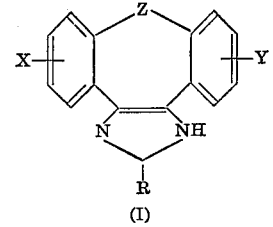

wherein Z, X, Y and R are as previously indicated, the following scheme is illustrative:

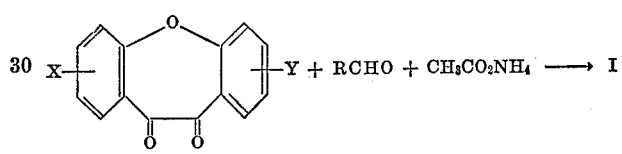

The above illustrated reaction is conducted under reaction conditions which are essentially those as employed by Davidson, et al., J. Org. Chem., 2, 319 (1937), and comprises heating a mixture of an α-diketone, an aldehyde or derivative thereof and ammonium acetate in a solvent of glacial acetic acid. As much as a five to ten fold excess of ammonium acetate can be employed. The amount of aldehyde used in relation to the diketone can vary from an equimolar amount to as much as a 100% excess.

In general, reflux temperatures are considered desirable although lower temperatures with correspondingly longer reaction periods are operable. When said reflux temperatures are employed reaction times of –12 hours are adequate to yield the desired product.

A convenient method for isolation of the product comprises dilution of the reaction mixture with water followed by neutralization with ammonium hydroxide to a pH of approximately 7. The resulting precipitate is then filtered, dried and recrystallized from an appropriate solvent.

The requisite α-diketones wherein X and Y are as defined and Z is ethylene are synthesized according to the method as taught by Leonard et al., J. Am. Chem. Soc., 77, 5078 (1955). Further, α-diketones wherein X and Y are as indicated and Z is sulphur are prepared by selenium dioxide oxidation of the corresponding monoketones which, in turn, are made according to the procedure as taught by Jilek et al., Monatsh. Chem., 96, 201 (1965). The appropriate aldehydes are either commercially available or easily prepared by one skilled in the art according to the methods as outlined by Carnduff, Quart. Rev., 20, 169 (1966).

A characteristic of the compounds of the present invention is the acidic nature of the imidazole hydrogen and the property to form salts with basic reagents such as alkali metal hydroxides, alkoxides or hydrides and alkali earth metal hydroxides.

It is these above described basic salts which can be alkylated giving rise to the compounds related to I where the imidazole hydrogen is replaced by $R_1$ which is lower alkyl.

Regarding alkylation, the imidazoles of the above formulae where $R_1$ is hydrogen are equivalent because of the tautomeric nature of the acidic hydrogen as illustrated.

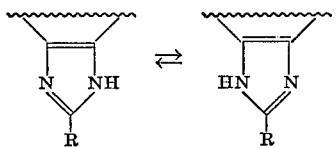

However, once alkylation has been carried out on the imidazole, tautomerization through migration of the alkyl group is impossible. A more detailed discussion of this concept is provided by Schipper et al., "Heterocyclic Compounds," vol. V, R. C. Elderfield, ed., John Wiley & Sons, Inc., New York, N.Y. (1957), chapter 4, page 198.

Thus, during alkylation of the imidazoles it can be noted that two positional isomers are frequently formed due to the difference in the nature of the X and Y substituents.

In the case of such experimental results, the mixture of isomers is recovered by methods known to those skilled in the art. In many of the preparations disclosed wherein a solid, often crystalline material, separates from the reaction mixture, the solid appears to consist predominantly of one of the isomers. Said isomer can be purified by repeated recrystallization from a suitable solvent to a constant melting point. The other isomer, the one present in smaller amounts in the originally isolated solid material, is the predominant product in the mother liquor. It can be recovered therefrom by methods known to those skilled in the art, as for example, the evaporation of the mother liquor and repeated crystallization of the residue to a product of constant melting point. Alternatively, the reaction mixture can be extracted either before or after evaporation to dryness.

Although said mixtures may be separated by methods known to those skilled in the art, for practical reasons it is advantageous to use said mixtures as they are isolated from the reaction. Further, it is frequently advantageous to purify these mixtures of isomers by at least one recrystallization from an appropriate solvent or by trituration in an appropriate solvent. Said recrystallization or trituration thus allows the separation of the mixture of positional isomers from such extraneous materials as starting material and undesirable by-products.

The identification of the isomers has not been completed. Both isomers of a given compound, however, exhibit the same type of activity, e.g., as anti-inflammatory agents.

Experimentally, a solution of the unalkylated imidazole in a highly polar, aprotic solvent such as dimethyl formamide, dimethylsulfoxide, or hexamethylphosphoramide is treated with at least an equivalent amount of an alkali metal alkoxide or hydride such as sodium methoxide or sodium hydride, thus forming the corresponding sodium salt in situ. The alkyl halide, either chloride, bromide, or iodide, is added, usually in an aprotic solvent, to the solution or suspension of the requisite salt of the imidazole. At least an equimolar amount of alkylating agent is added, plus as much as a 10–50% excess.

Reaction temperatures are not critical, but for convenience the reaction mixture is heated at steam bath temperatures for 1–5 hours. Following the completion of the reaction, the product or products are isolated and purified as disclosed above.

As has been previously mentioned, the compounds of the present invention, in addition to forming salts with basic reagents, can also, as previously mentioned, form acid addition salts. Said compounds of the present invention are converted to the acid addition salts by interaction of the base with an acid either in an aqueous or nonaqueous medium. In a similar manner, treatment of the acid addition salts with an equivalent amount of an aqueous base solution, e.g., alkali metal hydroxides, alkali metal carbonates and alkali metal bicarbonates or with an equivalent amount of a metal cation which forms an insoluble precipitate with the acid anion, results in a regeneration of the free base form. Such conversions are best carried out as rapidly as possible and under temperature conditions and method dictated by the stability of said basic products. The bases thus regenerated may be reconverted to the same or a different acid addition salt.

In the utilization of the chemotherapeutic activity of those compounds of the present invention which form salts, it is preferred, of course, to use pharamceutically acceptable salts. Although water-insolubility, high toxicity, or lack of crystalline nature may make some particular salt species unsuitable or less desirable for use as such in a given pharmaceutical application, the water insoluble or toxic salts can be converted to the corresponding pharmaceutically acceptable bases by decomposition of the salt as described above, or alternately they can be converted to any desired pharmaceutically acceptable acid addition salt.

Examples of acids which provide pharmaceutically acceptable anions are hydrochloric, hydrobromic, hydroiodic, nitric, sulfuric, or sulfurous, phosphoric, acetic, lactic, citric, tartaric, succinic, maleic, and gluconic acids.

As previously indicated, the tetracyclicimidazoles of the present invention are all readily adapted to therapeutic use as anti-inflammatory agents in mammals. Outstanding for their effectiveness in this regard are the following agents: 8,9-dihydro-2-phenyldibenzo[3,4,7,8]cycloöcta[1,2-d]imidazole (I: $Z=-CH_2CH_2-$; X, Y=H and $R=\phi$), 8,9-dihydro-2-(3-pyridyl)-dibenzo[3,4,7,8]cycloöcta[1,2-d]imidazole (I: $Z=-CH_2CH_2-$; X, Y=H and R=3-pyridyl), 8,9-dihydro-2-trifluoromethyldibenzo[3,4,7,8]cycloöcta[1,2-d]imidazole (I: $Z=-CH_2CH_2-$; X, Y=H and $R=CF_3$), 2-trifluoromethyldibenzo[b,f]thiepin[4,5-d]imidazole (I: Z=S; X, Y=H and $R=CF_3$), 2-(p-methoxyphenyl)dibenzo[b,f]thiepin[4,5-d]imidazole (I: Z=S; X, Y=H and $R=p-CH_3OC_6H_4$), 2-(3-pyridyl)-dibenzo[b,f]thiepin[4,5-d]imidazole (I: Z=S; X, Y=H and R=3-pyridyl) and 2-(p-carboxyphenyl)dibenzo[b,f]thiepin[4,5-d]imidazole (I: Z=S; X, Y=H and $R=p-HO_2CC_6H_4$).

A standard procedure for detecting and comparing anti-inflammatory activity of compounds in this series and for which there is an excellent correlation with human efficacy is the carrageenin rat foot edema test of Winter et al., Proc. Soc. Exp. Biol., 111, 544 (1962), whereby unanesthetized adult albino rats of 150–190 g. body weight are each numbered, weighed and marked with ink on the right lateral malleolus. One hour after administration of the drug by gavage, edema is induced by injection of 0.05 ml. of 1% solution of carrageenin into the plantar tissue of the marked paws. Immediately thereafter, the volume of the injected paw is measured. The increase in volume three hours after the injection of carrageenin constitutes the individual response. Compounds are considered active if the difference in response between a control and the drug being tested is significant. Standard compounds are phenylbutazone at 33 mg./kg. and acetylsalicylic acid at 100 mg./kg., both with oral administration.

The tetracyclicimidazoles and the pharmaceutically acceptable salts thereof, which were useful anti-inflammatory agents, may be administered either as individual therapeutic agents or as mixtures of therapeutic agents. They may be administered alone, but are generally administered with a pharmaceutical carrier selected on the basis of the chosen route of administration and standard pharmaceutical practice. For example, they may be administered orally in the form of tablets or capsules containing such excipients as starch, milk sugar or certain types of clay, etc. They may be administered orally in the form of elixirs or oral suspensions with the active ingredients combined with emulsifying and/or suspending agents. They may be injected parenterally, and for this use they, or appropriate derivatives, may be prepared in the form of sterile aqueous solutions. Such aqueous solutions should be suitably buffered, if necessary, and should contain other solutes such as saline or glucose to render them isotonic.

Although the use of the present invention is directed toward the treatment of mammals in general, the preferred subject is humans. In determining an efficacious dose for human therapy, results of animal testing are frequently extrapolated and a correlation is assumed between animal test behavior and proposed human dosage. When a commercially employed standard is available, the dose level of the clinical candidate in humans is frequently determined by comparison of its performance with the standard in an animal test. For example, phenylbutazone is employed as a standard anti-inflammatory agent and is administered to humans at the rate of 100 to 400 mg. daily. It is assumed, then, that if compounds of the present invention have activity comparable to phenylbutazone in the test assay, that similar doses will provide comparable responses in humans.

Obviously, the physician will ultimately determine the dosage which will be most suitable for a particular individual, and it will vary with the age, weight and response of the particular patient as well as with the nature and extent of the symptoms and the pharmacodynamic characteristics of the particular agent to be administered. Generally, small doses will be administered initially, with a gradual increase in the dosage until the optimum level is determined. It will often be found that when the composition is administered orally, larger quantities of the active ingredient will be required to produce the same level as produced by a small quantity administered parenterally.

Having full regard for the foregoing factors, an effective daily dosage of the compounds of the present invention in humans is approximately 0.1 to 1.0 g. per day, with a preferred range of about 0.2 to 0.8 g. per day in single or divided doses, or at about 3 to 10 mg./kg. of body weight will effectively alleviate inflammation in human subjects prone to said disorder. These values are illustrative, and there may, of course, be individual cases where higher or lower dose ranges are merited.

The following examples are provided solely for the purpose of illustration and are not to be construed as limitations of this invention, many variations of which are possible without departing from the spirit or scope thereof.

EXAMPLE I 8,9 - dihydro - 2 - (p - methoxyphenyl)dibenzo[3,4,7,8] cycloöcta[1,2-d]imidazole (I: Z=—CH$_2$CH$_2$—; X, Y=H and R=p-CH$_3$OC$_6$H$_4$)

To a solution of 1.5 g. (6.4 mmoles) of 11,12-dihydrocycloöcta[a,e]dibenzene-5,6-dione in 50 ml. of dry glacial acetic acid contained in a three-necked flask and under a nitrogen atmosphere is added 3.0 g. of ammonium acetate. To the resulting dark yellow solution is added, dropwise, 1.1 g. (7.7 mmoles) of p-methoxybenzaldehyde in 10 ml. of dry glacial acetic acid. The reaction mixture is heated to reflux overnight and is then cooled, poured into 300 ml. of ice-water and the pH adjusted to 7.0 by the addition of ammonium hydroxide solution. The resulting precipitate is filtered, dried and recrystallized from benzene, 385 mg., M.P. 318–320° C. A second recrystallization from benzene provided the analytical sample, M.P. 321–323° C.

*Analysis.*—Calcd. for C$_{24}$H$_{20}$N$_2$O (percent): C, 81.8; H, 5.7; N, 8.0. Found (percent): C, 81.2; H, 5.9; N, 7.6.

EXAMPLE II

Starting with 11,12-dihydrocycloöcta[a,e]dibenzene-5,6-dione and the requisite aldehyde, and repeating the procedure of Example I, the following compounds are prepared:

8,9-dihydro-2-phenyldibenzo[3,4,7,8]cycloöcta[1,2-d] imidazole, M.P. 334–335° C.;
8,9-dihydro-2-(p-bromophenyl)dibenzo[3,4,7,8]cycloöcta[1,2-d]imidazole, M.P. 358–360° C.;
8,9-dihydro-2-(p-chlorophenyl)dibenzo[3,4,7,8]cycloöcta[1,2-d]imidazole, M.P. 347–348° C.;
8,9-dihydro-2-(3-pyridyl)dibenzo[3,4,7,8]cycloöcta-[1,2-d]imidazole, M.P. 285–286° C.;
8,9-dihydro-2-(p-methylthiophenyl)dibenzo[3,4,7,8] cycloöcta[1,2-d]imidazole, M.P. 329–331° C.;
8,9-dihydro-2-trifluoromethyldibenzo[3,4,7,8]cycloöcta-[1,2-d]imidazole, M.P. 290–292° C.;
8,9-dihydro-2-(p-carboxyphenyl)dibenzo[3,4,7,8] cycloöcta[1,2-d]imidazole, M.P. 340–342° C.; and
8,9-dihydro-2-(p-dimethylaminophenyl)dibenzo[3,4,7,8] cycloöcta[1,2-d]imidazole, M.P. 308–311° C.

EXAMPLE III

The procedure of Example I is again repeated, starting with the appropriately substituted α-diketone and aldehyde, to provide the following congeners:

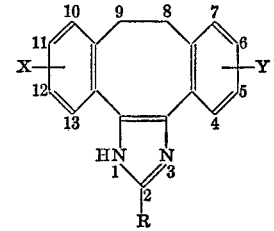

| X | Y | R | X | Y | R |
|---|---|---|---|---|---|
| H | H | 2-C$_5$H$_4$N | H | 7-CH$_3$ | m-BrC$_6$H$_4$ |
| H | H | 4-C$_5$H$_4$N | H | 7-CH$_3$ | p-CH$_3$SC$_6$H$_4$ |
| H | H | α-C$_{10}$H$_7$ | H | 7-CH$_3$ | m-CH$_3$SC$_6$H$_4$ |
| H | H | β-C$_{10}$H$_7$ | H | 7-CH$_3$ | C$_6$H$_5$ |
| H | H | o-CH$_3$C$_6$H$_4$ | H | 7-CH$_3$ | m-CH$_3$OC$_6$H$_4$ |
| H | H | m-CH$_3$C$_6$H$_4$ | H | 7-CH$_3$ | o-FC$_6$H$_4$ |
| H | H | p-CH$_3$C$_6$H$_4$ | H | 7-CH$_3$ | p-FC$_6$H$_4$ |
| H | H | m-CH$_3$OC$_6$H$_4$ | H | 4-CH$_3$O | C$_6$H$_5$ |
| H | H | o-FC$_6$H$_4$ | H | 4-CH$_3$O | p-CH$_3$C$_6$H$_4$ |
| H | H | p-FC$_6$H$_4$ | H | 4-CH$_3$O | o-CH$_3$OC$_6$H$_4$ |
| H | H | m-ClC$_6$H$_4$ | H | 4-CH$_3$O | p-CH$_3$OC$_6$H$_4$ |
| H | H | m-BrC$_6$H$_4$ | H | 4-CH$_3$O | p-HO$_2$CC$_6$H$_4$ |
| H | H | o-CH$_3$SC$_6$H$_4$ | H | 5-CH$_3$O | C$_6$H$_5$ |
| H | H | m-(CH$_3$)$_2$NC$_6$H$_4$ | H | 5-CH$_3$O | o-CH$_3$C$_6$H$_4$ |
| H | 5-CH$_3$ | C$_6$H$_5$ | H | 5-CH$_3$O | o-FC$_6$H$_4$ |
| H | 5-CH$_3$ | CF$_3$ | H | 5-CH$_3$O | m-FC$_6$H$_4$ |
| H | 5-CH$_3$ | p-ClC$_6$H$_4$ | H | 5-CH$_3$O | m-ClC$_6$H$_4$ |
| H | 5-CH$_3$ | p-CH$_3$C$_6$H$_4$ | H | 5-CH$_3$O | p-ClC$_6$H$_4$ |
| H | 6-CH$_3$ | 3-C$_5$H$_4$N | H | 5-CH$_3$O | p-BrC$_6$H$_4$ |
| H | 6-CH$_3$ | p-CH$_3$OC$_6$H$_4$ | H | 5-CH$_3$O | p-(CH$_3$)$_2$NC$_6$H$_4$ |
| H | 6-CH$_3$ | p-FC$_6$H$_4$ | H | 5-CH$_3$O | o-CH$_3$SC$_6$H$_4$ |
| H | 6-CH$_3$ | m-FC$_6$H$_4$ | H | 5-CH$_3$O | CF$_3$ |
| H | 6-CH$_3$ | p-HO$_2$CC$_6$H$_4$ | H | 6-CH$_3$O | C$_6$H$_5$ |
| H | 4-CH$_3$ | 3-C$_5$H$_4$N | H | 6-CH$_3$O | p-CH$_3$C$_6$H$_4$ |
| H | 4-CH$_3$ | p-CH$_3$OC$_6$H$_4$ | H | 6-CH$_3$O | o-CH$_3$OC$_6$H$_4$ |
| H | 4-CH$_3$ | p-FC$_6$H$_4$ | H | 6-CH$_3$O | p-CH$_3$OC$_6$H$_4$ |
| H | 4-CH$_3$ | m-FC$_6$H$_4$ | H | 6-CH$_3$O | p-HO$_2$CC$_6$H$_4$ |
| H | 4-CH$_3$ | p-HO$_2$CC$_6$H$_4$ | H | 7-CH$_3$O | CF$_3$ |
| H | 7-CH$_3$ | α-C$_{10}$H$_7$ | H | 7-CH$_3$O | o-FC$_6$H$_4$ |
| H | 7-CH$_3$ | 2-C$_5$H$_4$N | H | 7-CH$_3$O | m-FC$_6$H$_4$ |
| H | 7-CH$_3$O | p-ClC$_6$H$_4$ | H | 7-CH$_3$O | β-C$_{10}$H$_7$ |
| H | 7-CH$_3$O | p-BrC$_6$H$_4$ | H | 4-Cl | CF$_3$ |
| H | 7-CH$_3$O | o-CH$_3$SC$_6$H$_4$ | H | 4-Cl | C$_6$H$_5$ |
| H | 7-CH$_3$O | 3-C$_5$H$_4$N | H | 4-Cl | p-HO$_2$CC$_6$H$_4$ |
| H | 7-CH$_3$O | o-HO$_2$CC$_6$H$_4$ | H | 4-Cl | p-CH$_3$OC$_6$H$_4$ |
| H | 4-F | CF$_3$ | H | 5-Cl | o-ClC$_6$H$_4$ |
| H | 4-F | p-(CH$_3$)$_2$NC$_6$H$_4$ | H | 5-Cl | m-ClC$_6$H$_4$ |
| H | 4-F | p-CH$_3$C$_6$H$_4$ | H | 5-Cl | o-FC$_6$H$_4$ |
| H | 4-F | m-CH$_3$C$_6$H$_4$ | H | 5-Cl | p-CH$_3$OC$_6$H$_4$ |
| H | 4-F | C$_6$H$_5$ | H | 5-Cl | p-CH$_3$SC$_6$H$_4$ |
| H | 5-F | C$_6$H$_5$ | H | 6-Cl | CF$_3$ |
| H | 5-F | CF$_3$ | H | 6-Cl | C$_6$H$_5$ |
| H | 5-F | 3-C$_5$H$_4$N | H | 6-Cl | p-HO$_2$CC$_6$H$_4$ |
| H | 5-F | o-CH$_3$OC$_6$H$_4$ | H | 6-Cl | p-CH$_3$OC$_6$H$_4$ |
| H | 5-F | p-CH$_3$OC$_6$H$_4$ | H | 7-Cl | CF$_3$ |
| H | 5-F | m-CH$_3$OC$_6$H$_4$ | H | 7-Cl | o-BrC$_6$H$_4$ |
| H | 5-F | p-BrC$_6$H$_4$ | H | 7-Cl | m-BrC$_6$H$_4$ |
| H | 5-F | p-ClC$_6$H$_4$ | H | 7-Cl | p-HO$_2$CC$_6$H$_4$ |
| H | 5-F | p-FC$_6$H$_4$ | H | 7-Cl | C$_6$H$_5$ |
| H | 6-F | CF$_3$ | H | 4-Br | CF$_3$ |
| H | 6-F | p-(CH$_3$)$_2$NC$_6$H$_4$ | H | 4-Br | C$_6$H$_5$ |

TABLE—Continued

| X | Y | R | X | Y | R |
|---|---|---|---|---|---|
| H | 6-F | p-CH₃C₆H₄ | H | 4-Br | p-CH₃OC₆H₄ |
| H | 6-F | m-CH₃C₆H₄ | H | 5-Br | CF₃ |
| H | 6-F | C₆H₅ | H | 5-Br | o-CH₃SC₆H₄ |
| H | 7-F | α-C₁₀H₇ | H | 5-Br | o-CH₃OC₆H₄ |
| H | 7-F | β-C₁₀H₇ | H | 5-Br | p-CH₃OC₆H₄ |
| H | 7-F | C₆H₅ | H | 5-Br | p-(CH₃)₂NC₆H₄ |
| H | 7-F | m-CH₃SC₆H₄ | H | 5-CH₃S | p-(CH₃)₂NC₆H₄ |
| H | 7-F | p-CH₃OC₆H₄ | H | 6-CH₃S | CF₃ |
| H | 7-F | o-FC₆H₄ | H | 6-CH₃S | α-C₁₀H₇ |
| H | 7-F | p-FC₆H₄ | H | 6-CH₃S | β-C₁₀H₇ |
| H | 7-Br | CF₃ | H | 6-CH₃S | p-CH₃SC₆H₄ |
| H | 7-Br | 3-C₅H₄N | H | 5-Br | p-FC₆H₄ |
| H | 7-Br | 4-C₅H₄N | H | 6-Br | CF₃ |
| H | 7-Br | C₆H₅ | H | 6-Br | C₆H₅ |
| H | 7-Br | p-ClC₆H₄ | H | 6-Br | p-CH₃OC₆H₄ |
| H | 4-CH₃S | CF₃ | H | 6-CH₃S | p-CH₃OC₆H₄ |
| H | 4-CH₃S | α-C₁₀H₇ | H | 7-CH₃S | CF₃ |
| H | 4-CH₃S | β-C₁₀H₇ | H | 7-CH₃S | o-ClC₆H₄ |
| H | 4-CH₃S | p-CH₃SC₆H₄ | H | 7-CH₃S | p-ClC₆H₄ |
| H | 4-CH₃S | p-CH₃OC₆H₄ | H | 7-CH₃S | p-BrC₆H₄ |
| H | 5-CH₃S | C₆H₅ | H | 7-CH₃S | p-CH₃C₆H₄ |
| H | 5-CH₃S | o-FC₆H₄ | H | 7-CH₃S | 2-C₅H₄N |
| H | 5-CH₃S | m-FC₆H₄ | H | 7-CH₃S | 3-C₅H₄N |
| H | 5-CH₃S | p-FC₆H₄ | H | 7-CH₃S | 4-C₅H₄N |
| H | 5-CH₃S | m-HO₂CC₆H₄ | | | |

EXAMPLE IV 8,9 - dihydro - 2 - trifluoromethyl - 5,12 - dichlorodibenzo-[3,4;7,8]cyclooctal[1,2-d]imidazole (I: Z=—CH₂CH₂—; X, Y=Cl; R=CF₃)

A solution of 3.04 g. (10 mmoles) of 11,12-dihydro-3,8-dichlorocycloöcta[a,e]dibenzene-5,6-dione in 100 ml. of anhydrous glacial acetic acid, under a nitrogen atmosphere, is treated with 4.7 g. of ammonium acetate followed by 4.3 g. (30 mmoles) of trifluoroacetaldehyde ethyl hemiacetal in 50 ml. of the same solvent. The resulting solution is heated to reflux for 3 hours, an additional 4.3 g. of the hemiacetal added and heating continued for 3 hours more. The reaction mixture is cooled, poured into a mixture of ice and water and the pH adjusted to 7 using concentrated ammonium hydroxide solution. The crude product is filtered, dried and purified by recrystallization several times from toluene.

EXAMPLE V

Starting with the requisite 11,12-dihydrocycloöcta[a,e]dibenzene-5,6-dione and aldehyde, and following the procedure of Example IV, the following tetracyclicimidazole analogs are synthesized:

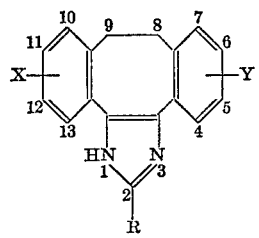

| X | Y | R | X | Y | R |
|---|---|---|---|---|---|
| 13-CH₃ | 5-CH₃ | CF₃ | 10-F | 6-Cl | p-CH₃C₆H₄ |
| 13-CH₃ | 5-CH₃ | p-CH₃C₆H₄ | 10-F | 6-Cl | o-CH₃C₆H₄ |
| 13-CH₃ | 5-CH₃ | p-CH₃OC₆H₄ | 10-F | 6-Cl | α-C₁₀H₇ |
| 13-CH₃ | 5-CH₃ | o-CH₃OC₆H₄ | 10-F | 6-Cl | CF₃ |
| 13-CH₃ | 5-CH₃ | p-FC₆H₄ | 13-Cl | 6-Cl | CF₃ |
| 13-CH₃O | 5-CH₃ | m-FC₆H₄ | 13-Cl | 6-Cl | 3-C₅H₄N |
| 13-CH₃O | 5-CH₃ | 3-C₅H₄N | 13-Cl | 5-Br | o-CH₃C₆H₄ |
| 13-CH₃O | 5-CH₃ | 4-C₅H₄N | 13-Cl | 5-Br | m-CH₃C₆H₄ |
| 13-CH₃O | 5-CH₃ | C₆H₅ | 13-Cl | 5-Br | p-CH₃C₆H₄ |
| 13-CH₃O | 7-CH₃ | C₆H₅ | 11-Cl | 5-Br | p-CH₃OC₆H₄ |
| 13-CH₃O | 7-CH₃ | CF₃ | 11-Cl | 5-Br | CF₃ |
| 13-CH₃O | 7-CH₃ | p-(CH₃)₂NC₆H₄ | 11-Cl | 5-CH₃O | CF₃ |
| 12-CH₃O | 7-CH₃ | p-HO₂CC₆H₄ | 11-Cl | 5-CH₃O | C₆H₄ |
| 12-CH₃O | 7-CH₃ | α-C₁₀H₇ | 11-Cl | 5-CH₃O | m-CH₃SC₆H₄ |
| 12-CH₃O | 5-F | CF₃ | 11-Cl | 5-CH₃O | p-CH₃SC₆H₄ |
| 12-CH₃O | 5-F | C₆H₅ | 11-Cl | 5-CH₃O | p-HO₂CC₆H₄ |
| 11-CH₃O | 5-F | 2-C₅H₄N | 10-Br | 5-CH₃O | CF₃ |
| 11-CH₃O | 5-F | 4-C₅H₄N | 10-Br | 5-CH₃O | p-(CH₃)₂NC₆H₄ |
| 11-CH₃O | 5-F | p-BrC₆H₄ | 10-Br | 5-CH₃ | p-(CH₃)₂NC₆H₄ |
| 11-CH₃O | 6-F | p-CH₃SC₆H₄ | 10-Br | 5-CH₃ | CF₃ |
| 11-CH₃O | 6-F | p-CH₃OC₆H₄ | 10-Br | 5-CH₃ | m-BrC₆H₄ |
| 12-CH₃O | 6-F | o-FC₆H₄ | 10-Br | 5-CH₃ | m-ClC₆H₄ |
| 13-F | 6-F | o-ClC₆H₄ | 13-CH₃S | 5-CH₃ | p-CH₃SC₆H₄ |
| 13-F | 6-F | p-ClC₆H₄ | 13-CH₃S | 5-CH₃ | m-CH₃SC₆H₄ |
| | | | 10-Br | 7-Br | p-HO₂CC₆H₄ |
| | | | 11-F | 7-Br | p-CH₃SC₆H₄ |
| 13-F | 6-Cl | p-ClC₆H₄ | 13-CH₃S | 5-CH₃ | CF₃ |
| 13-F | 6-Cl | m-ClC₆H₄ | 13-CH₃S | 7-F | CF₃ |
| 13-F | 6-Cl | p-CH₃C₆H₄ | 13-CH₃S | 7-F | C₆H₅ |
| 11-F | 6-Cl | β-C₁₀H₇ | 13-CH₃ | 7-F | β-C₁₀H₇ |
| 11-F | 6-Cl | o-(CH₃)₂NC₆H₄ | 13-CH₃ | 7-F | 3-C₅H₄N |
| 11-F | 6-Cl | o-HO₂CC₆H₄ | 13-CH₃ | 7-F | 4-C₅H₄N |
| 11-F | 6-Cl | m-CH₃OC₆H₄ | 13-CH₃ | 7-F | p-BrC₆H₄ |
| 13-CH₃ | 5-Cl | p-ClC₆H₄ | 11-CH₃O | 7-Br | o-BrC₆H₄ |
| 13-CH₃ | 5-Cl | p-FC₆H₄ | 11-CH₃O | 7-Br | p-BrC₆H₄ |
| 13-CH₃ | 5-Cl | CF₃ | 11-CH₃O | 7-Br | CF₃ |
| 13-CH₃ | 5-Cl | C₆H₅ | 11-CH₃O | 5-CH₃S | CF₃ |
| 13-CH₃S | 5-Cl | C₆H₅ | 11-CH₃O | 5-CH₃S | C₆H₅ |
| 13-CH₃S | 5-Cl | CF₃ | 11-CH₃O | 5-CH₃S | p-ClC₆H₄ |
| 13-CH₃S | 5-Cl | p-(CH₃)₂NC₆H₄ | 11-CH₃O | 5-CH₃S | p-CH₃OC₆H₄ |
| 13-CH₃S | 5-CH₃S | α-C₁₀H₇ | 11-CH₃O | 7-CH₃O | p-CH₃OC₆H₄ |
| 13-CH₃S | 5-CH₃S | β-C₁₀H₇ | 11-CH₃O | 7-CH₃O | m-CH₃C₆H₄ |

TABLE—Continued

| X | Y | R | X | Y | R |
|---|---|---|---|---|---|
| 13-CH₃S | 5-CH₃S | CF₃ | 11-CH₃O | 7-CH₃O | o-CH₃C₆H₄ |
| 10-Br | 5-CH₃S | CF₃ | 11-CH₃O | 7-CH₃O | o-CH₃OC₆H₄ |
| 10-Br | 5-CH₃S | 2-C₅H₄N | 11-F | 7-Br | o-FC₆H₄ |
| 10-Br | 5-CH₃S | 4-C₅H₄N | 11-F | 7-Br | p-FC₆H₄ |
| 10-Br | 7-Br | C₆H₅ | | | |
| 10-Br | 7-Br | m-HO₂CC₆H₄ | | | |

EXAMPLE VI 2-trifluoromethyldibenzo[b,f]thiepin[4,5-d]imidazole
(I: Z=S; X, Y=H and R=CF₃)

A mixture of 170 mg. (0.7 mmole) of 10,11-dihydrodibenzo[b,f]thiepin-10,11-dione, 300 mg. (2.1 mmoles) of trifluoroacetaldehyde ethyl hemiacetal and 4.0 g. of ammonium acetate in 40 ml. of anhydrous glacial acetic acid is heated to the reflux temperature for one hour. An additional 170 mg. of diketone and 300 mg. of hemiacetal in 5 ml. of the same solvent are added and the refluxing continued for one more hour. The addition is repeated again, and the mixture heated at reflux temperatures for 3 hours. The reaction mixture is cooled, poured into ice-water and the pH adjusted with ammonium hydroxide to 7. The crude product is filtered, dried and recrystallized from benzene, 300 mg., M.P. 255–257° C.

*Analysis.*—Calcd. for C₁₆H₉N₂SF₃ (percent): C, 60.4; H, 2.8; N, 8.8. Found (percent): C, 60.4; H, 2.1; N, 8.6.

EXAMPLE VII

Starting with 10,11-dihydrodibenzo[b,f]thiepin-10,11-dione and the appropriate aldehyde and repeating the procedure of Example VI, the following compounds are prepared:

2-phenyldibenzo[b,f]thiepin[4,5-d]imidazole, M.P. 312° C., dec.;
2-(p-methoxyphenyl)dibenzo[b,f]thiepin[4,5-d]imidazole, M.P. 300° C., dec.;
2-(p-bromophenyl)dibenzo[b,f]thiepin[4,5-d]imidazole, M.P. 334° C., dec.;
2-(p-chlorophenyl)dibenzo[b,f]thiepin[4,5-d]imidazole, M.P. 323° C., dec.;
2-(3-pyridyl)dibenzo[b,f]thiepin[4,5-d]imidazole, M.P. 230° C., dec.;
2-(p-carboxyphenyl)dibenzo[b,f]thiepin[4,5-d]imidazole, M.P. >360° C.; and
2-(p-dimethylaminophenyl)dibenzo[b,f]thiepin[4,5-d]imidazole, M.P. 321° C., dec.

Starting with the appropriately substituted 10,11-dihydrodibenzo[b,f]thiepin-10,11-dione and requisite aldehyde, and employing the procedure of Example VI, the following compounds are prepared:

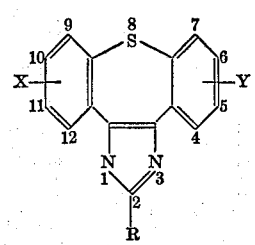

| X | Y | R | X | Y | R |
|---|---|---|---|---|---|
| H | H | α-C₁₀H₇ | H | 5-CH₃O | 2-C₅H₄N |
| H | H | β-C₁₀H₇ | H | 5-CH₃O | 4-C₅H₄N |
| H | H | 2-C₅H₄N | H | 5-CH₃O | m-CH₃C₆H₄ |
| H | H | p-FC₆H₄ | H | 5-CH₃O | p-CH₃C₆H₄ |
| H | H | o-FC₆H₄ | H | 5-CH₃O | β-C₁₀H₇ |
| H | H | m-HO₂CC₆H₄ | H | 7-CH₃O | CF₃ |

TABLE—Continued

| X | Y | R | X | Y | R |
|---|---|---|---|---|---|
| H | H | o-CH₃C₆H₄ | H | 7-CH₃O | m-BrCC₆H₄ |
| H | H | o-CH₃OC₆H₄ | H | 7-CH₃O | p-BrC₆H₄ |
| H | H | m-CH₃OC₆H₄ | H | 7-CH₃O | o-ClC₆H₄ |
| H | H | p-CH₃SC₆H₄ | H | 7-CH₃O | o-FC₆H₄ |
| H | 4-CH₃ | p-CH₃SC₆H₄ | H | 4-F | CF₃ |
| H | 4-CH₃ | CF₃ | H | 4-F | C₆H₅ |
| H | 4-CH₃ | C₆H₅ | H | 4-F | 3-C₅H₄N |
| H | 4-CH₃ | p-(CH₃)₂HC₆N₄ | H | 4-F | 4-C₅H₄N |
| H | 4-CH₃ | p-FC₆H₄ | H | 4-F | p-CH₃SC₆H₄ |
| H | 5-CH₃ | p-FC₆H₄ | H | 6-F | CF₃ |
| H | 5-CH₃ | p-ClC₆H₄ | H | 6-F | o-CH₃OC₆H₄ |
| H | 5-CH₃ | p-BrC₆H₄ | H | 6-F | m-CH₃OC₆H₄ |
| H | 5-CH₃ | o-CH₃OC₆H₄ | H | 6-F | p-CH₃OC₆H₄ |
| H | 5-CH₃ | m-CH₃C₆H₄ | H | 6-F | p-HO₂CC₆H₄ |
| H | 7-CH₃ | m-HO₂CC₆H₄ | H | 5-CH₃S | p-FC₆H₄ |
| | | | H | 5-CH₃S | 2-C₅H₄N |
| | | | H | 5-Cl | p-HO₂CC₆H₄ |
| H | 7-CH₃ | p-HO₂CC₆H₄ | H | 5-Cl | α-C₁₀H₇ |
| H | 7-CH₃ | p-CH₃SC₆H₄ | H | 5-Cl | β-C₁₀H₇ |
| H | 7-CH₃ | α-C₁₀H₇ | H | 5-Cl | C₆H₅ |
| H | 5-CH₃O | CF₃ | H | 5-Cl | CF₃ |
| H | 5-CH₃O | C₆H₅ | H | 7-Cl | CF₃ |
| H | 7-Cl | o-FC₆H₄ | H | 5-CH₃S | α-C₁₀H₇ |
| H | 7-Cl | m-FC₆H₄ | H | 5-CH₃S | β-C₁₀H₇ |
| H | 7-Cl | p-FC₆H₄ | H | 5-CH₃S | 3-C₅H₄N |
| H | 7-Cl | p-(CH₃)₂NC₆H₄ | H | 5-CH₃S | 4-C₅H₄N |
| H | 7-Cl | m-(CH₃)₂NC₆H₄ | H | 5-CH₃S | CF₃ |
| H | 4-Br | o-HO₂CC₆H₄ | H | 5-CH₃S | o-CH₃SC₆H₄ |
| H | 4-Br | m-HO₂CC₆H₄ | H | 6-CH₃S | o-BrC₆H₄ |
| H | 4-Br | CF₃ | H | 6-CH₃S | m-BrC₆H₄ |
| H | 4-Br | C₆H₅ | H | 6-CH₃S | m-(CH₃)₂NC₆H₄ |
| H | 5-Br | C₆H₅ | H | 6-CH₃S | p-HO₂CC₆H₄ |
| H | 5-Br | p-CH₃OC₆H₄ | H | 7-CH₃S | p-HO₂CC₆H₄ |
| H | 5-Br | m-CH₃OC₆H₄ | H | 7-CH₃S | CF₃ |
| H | 5-Br | CF₃ | H | 7-CH₃S | C₆H₅ |
| H | 5-Br | p-(CH₃)₂NC₆H₄ | H | 7-CH₃S | o-ClC₆H₄ |
| H | 6-Br | p-(CH₃)₂NC₆H₄ | H | 7-CH₃S | p-ClC₆H₄ |
| H | 6-Br | CF₃ | H | 7-CH₃S | p-CH₃C₆H₄ |
| H | 6-Br | o-ClC₆H₄ | | | |
| H | 6-Br | p-ClC₆H₄ | | | |

EXAMPLE IX 2-phenyl-5,11-dichlorodibenzo[b,f]thiepin[4,5-d]imidazole (I: Z=S; X, Y=Cl; R=C₆H₅)

A mixture of 3.08 (0.01 mole) of 2,8-dichloro-10,11-dihydrobenzo[b,f]thiepin-10,11-dione 7.0 g. of ammonium acetate and 1.28 g. (0.012 mole) of benzaldehyde in 85 ml. of dry glacial acetic acid is heated to reflux for 12 hours. The reaction mixture is cooled, poured into ice-water and ammonium hydroxide added until a pH of 7 is achieved. The precipitate is suction filtered and dried. Recrystallization from benzene provides the desired purified product.

EXAMPLE X

Employing the aforedescribed procedure of Example IX, and starting with the requisite ketone and aldehyde, the following analogs are synthesized:

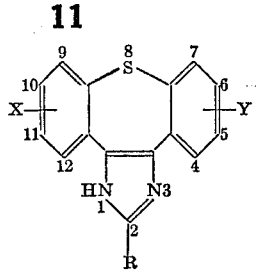

| X | Y | R | X | Y | R |
|---|---|---|---|---|---|
| 10-CH₃S | 5-Cl | 2-C₅H₄N | 10-CH₃S | 7-CH₃S | C₆H₅ |
| 10-CH₃S | 5-Cl | CF₃ | 10-CH₃S | 7-CH₃S | CF₃ |
| 10-CH₃S | 5-Cl | C₆H₅ | 10-CH₃S | 7-CH₃S | p-FC₆H₄ |
| 12-CH₃ | 4-CH₃ | CF₃ | 12-Cl | 4-Cl | p-ClC₆H₄ |
| 12-CH₃ | 4-CH₃ | C₆H₅ | 12-Cl | 4-Cl | p-FC₆H₄ |
| 12-CH₃ | 4-CH₃ | 3-C₅H₄N | 12-Cl | 4-Cl | o-BrC₆H₄ |
| 12-CH₃ | 4-CH₃ | 4-C₅H₄N | 10-Cl | 4-Cl | 3-C₅H₄N |
| 10-CH₃ | 4-CH₃ | p-HO₂CC₆H₄ | 10-Cl | 4-Cl | C₆H₅ |
| 10-CH₃ | 4-CH₃ | p-CH₃OC₆H₄ | 10-Cl | 5-Cl | C₆H₅ |
| 10-CH₃ | 5-CH₃ | p-CH₃OC₆H₄ | 10-Cl | 5-Cl | m-HO₂CC₆H₄ |
| 10-CH₃ | 5-CH₃ | CF₃ | 10-Cl | 5-Cl | p-HO₂CC₆H₄ |
| 10-CH₃ | 5-CH₃ | p-(CH₃)₂NC₆H₄ | 10-Br | 5-Cl | p-(CH₃)₂NC₆H₄ |
| 10-OCH₃ | 5-CH₃ | α-C₁₀H₇ | 10-Br | 5-Cl | m-BrC₆H₄ |
| 10-OCH₃ | 5-CH₃ | β-C₁₀H₇ | 10-Br | 5-Cl | CF₃ |
| 10-OCH₃ | 5-CH₃ | p-CH₃OC₆H₄ | 10-Br | 5-CH₃O | CF₃ |
| 10-OCH₃ | 5-F | m-CH₃OC₆H₄ | 10-Br | 5-CH₃O | C₆H₅ |
| 10-OCH₃ | 5-F | m-CH₃C₆H₄ | 9-Br | 5-CH₃O | m-FC₆H₄ |
| 10-OCH₃ | 5-F | o-FC₆H₄ | 9-Br | 5-CH₃O | p-FC₆H₄ |
| 10-OCH₃ | 5-F | m-ClC₆H₄ | 9-Br | 5-CH₃O | p-CH₃SC₆H₄ |
| 11-F | 5-F | p-BrC₆H₄ | 9-Br | 7-CH₃ | CF₃ |
| 11-F | 5-F | CF₃ | 9-Br | 7-CH₃ | o-CH₃SC₆H₄ |
| 11-F | 5-CH₃O | CF₃ | 10-CH₃S | 7-CH₃ | 3-C₅H₄N |
| 11-F | 5-CH₃O | C₆H₅ | 10-CH₂S | 7-CH₃ | 4-C₅H₄N |
| 11-F | 5-CH₃O | p-FC₆H₄ | 10-CH₃S | 7-CH₃ | α-C₁₀H₇ |
| 11-F | 5-CH₃O | o-HO₂CC₆H₄ | 10-CH₃S | 5-Br | α-C₁₀H₇ |
| 11-F | 5-CH₃O | o-(CH₃)₂NC₆H₄ | 10-CH₃S | 5-Br | CF₃ |
| 9-F | 5-CH₃O | 2-C₅H₄N | 10-CH₃S | 5-Br | m-CH₃OC₆H₄ |
| 9-F | 5-CH₃O | 4-C₅H₄N | 10-CH₃S | 5-Br | o-CH₃SC₆H₄ |
| 9-F | 7-CH₃O | m-CH₃OC₆H₄ | 9-F | 5-Br | p-CH₃C₆H₄ |
| 9-F | 7-CH₃O | p-CH₃SC₆H₄ | 9-F | 5-Br | p-BrC₆H₄ |
| 9-F | 7-CH₃O | p-BrC₆H₄ | 9-F | 5-CH₃S | m-FC₆H₄ |
| 12-Cl | 7-CH₃O | m-BrC₆H₄ | 9-F | 5-CH₃S | p-FC₆H₄ |
| 12-Cl | 7-CH₃O | β-C₁₀H₇ | 9-F | 5-CH₃S | p-HO₂CC₆H₄ |
| 12-Cl | 7-CH₃O | CF₃ | 9-F | 5-CH₃S | p-CH₃C₆H₄ |
| 11-CH₃ | 5-F | CF₃ | 10-CH₃S | 7-CH₃S | p-CH₃OC₆H₄ |
| 11-CH₃ | 5-F | C₆H₅ | 10-CH₃O | 7-CH₃S | m-CH₃SC₆H₄ |
| 11-CH₃ | 5-F | p-CH₃SC₆H₄ | 10-CH₃O | 7-CH₃S | p-CH₃SC₆H₄ |
| 11-CH₃ | 5-F | p-CH₃OC₆H₄ | 10-CH₃O | 7-CH₃S | o-HO₂CC₆H₄ |
| 11-CH₃ | 5-Cl | CF₃ | 10-CH₃O | 6-Br | p-HO₂CC₆H₄ |
| 11-CH₃ | 5-Cl | p-(CH₃)₂NC₆H₄ | 10-Br | 6-Br | CF₃ |
| 11-CH₃ | 5-Cl | m-BrC₆H₄ | 10-Br | 6-Br | o-CH₃C₆H₄ |
| 12-F | 5-Cl | p-BrC₆H₄ | 10-Br | 6-Br | m-CH₃C₆H₄ |
| 12-F | 5-Cl | 2-C₅H₄N | 10-Br | 6-Br | o-BrC₆H₄ |
| 12-F | 5-Cl | 3-C₅H₄N | 10-Br | 6-Br | m-ClC₆H₄ |

EXAMPLE XI 8,9-dihydro-1-methyl-2-(p-chloromethylphenyl)dibenzo-[3,4,7,8]cycloöcta[1,2-d]imidazole To a suspension of 180 mg. (3 mmoles) of 40% sodium hydride washed with hexane in 5 ml. of dry dimethylformamide is added dropwise a solution of 1.0 g. (2.8 mmoles) of 8,9-dihydro-2-(p-chlorophenyl)dibenzo-[3,4,7,8]cycloöcta[1,2-d]imidazole in 25 ml. of the same solvent. The pale yellow suspension is allowed to stir at room temperature for one hour, followed by the rapid addition of 425 mg. (2.9 mmoles) of methyl iodide. The reaction mixture is heated overnight on a steam bath and is then cooled and poured into water. The resulting precipitate is filtered and dried.

EXAMPLE XII

Employing the procedure of Example XI and starting with the appropriate reagents, the following products are synthesized:

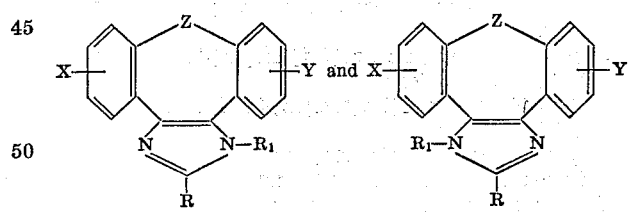

| Z | X | Y | R | R₁ |
|---|---|---|---|---|
| —CH₂CH₂— | H | H | C₆H₅ | CH₃ |
| —CH₂CH₂— | H | H | C₆H₅ | C₂H₅ |
| —CH₂CH₂— | H | H | C₆H₅ | n-C₃H₇ |
| —CH₂CH₂— | H | H | CF₃ | CH₃ |
| —CH₂CH₂— | H | H | 3-C₅H₄N | CH₃ |
| —CH₂CH₂— | H | 5-CH₃O | CF₃ | C₂H₅ |
| —CH₂CH₂— | H | 5-Cl | o-FC₆H₄ | CH₃ |
| —CH₂CH₂— | H | 5-Cl | p-CH₃SC₆H₅ | n-C₃H₇ |
| —CH₂CH₂— | 13-CH₃ | 5-CH₃ | p-CH₃OC₆H₄ | i-C₃H₇ |
| —CH₂CH₂— | 13-CH₃O | 5-CH₃ | C₆H₅ | C₂H₅ |
| —CH₂CH₂— | 13-CH₃O | 5-CH₃ | C₆H₅ | n-C₄H₉ |
| —CH₂CH₂— | 13-Cl | 6-Cl | CF₃ | CH₃ |
| —CH₂CH₂— | 10-Br | 5-CH₃O | CF₃ | C₂H₅ |
| S | H | H | α-C₁₀H₇ | CH₃ |
| S | H | H | 2-C₅H₄N | CH₃ |
| S | H | H | o-CH₃C₆H₄ | CH₃ |
| S | H | H | o-CH₃C₆H₄ | C₂H₅ |
| S | H | 5-CH₃ | o-CH₃OC₆H₄ | C₂H₅ |
| S | H | 5-CH₃ | CF₃ | CH₃ |
| S | 12-CH₃ | 4-CH₃ | C₆H₅ | n-C₃H₇ |
| S | 10-CH₃O | 5-F | o-FC₆H₄ | C₂H₅ |
| S | 11-F | 5-CH₃O | o-(CH₃)₂NC₆H₄ | CH₃ |
| S | 12-Cl | 7-CH₃O | m-BrC₆H₄ | CH₃ |
| S | 12-Cl | 7-CH₃O | CF₃ | CH₃ |
| S | 12-Cl | 7-CH₃O | CF₃ | C₂H₅ |
| S | 10-Br | 5-Cl | CF₃ | CH₃ |
| S | 10-CH₃S | 7-CH₃ | 4-C₅H₄N | C₂H₅ |
| S | 9-F | 5-CH₃S | p-FC₆H₄ | CH₃ |
| S | 10-CH₃S | 7-CH₃S | CF₃ | CH₃ |
| S | 10-Br | 6-Br | o-CH₃C₆H₄ | n-C₄H₉ |

EXAMPLE XIII

Employing the carrageenin rat foot edema test as a measure of anti-inflammatory activity, the following representative tetracyclicimidazoles were found to have the indicated activity at the specified dose:

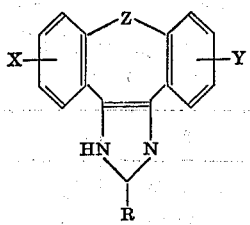

| X | Y | Z | R | Activity Percent Inhibition | Dose, mg./kg., p.o. |
|---|---|---|---|---|---|
| H | H | —CH₂CH₂— | C₆H₅ | 46 | 33 |
| H | H | —CH₂CH₂— | p-ClC₆H₄ | 19 | 33 |
| H | H | —CH₂CH₂— | 3-C₂H₄N | 21 | 33 |
| H | H | —CH₂CH₂— | p-CH₃SC₆H₄ | 20 | 33 |
| H | H | —CH₂CH₂— | CF₃ | 20 | 33 |
| H | H | —CH₂CH₂— | p-HO₂CC₆H₄ | 11 | 33 |
| H | H | S | C₆H₅ | 19 | 33 |
| H | H | S | p-CH₃OC₆H₄ | 35 | 33 |
| H | H | S | p-BrC₆H₄ | 13 | 33 |
| H | H | S | 3-C₅H₄N | 25 | 33 |
| H | S | S | CF₃ | 36 | 33 |
| H | S | S | CF₃ | 15 | 10 |
| H | S | S | p-HO₂CC₆H₄ | 28 | 33 |
| Phenylbutazone | | | | 55 | 33 |

EXAMPLE XIV 8,9-dihydro-2-(p-methoxyphenyl)dibenzo[3,4,7,8]cycloöcta[1,2-d]imidazole hydrochloride To a warm solution of 3.5 g. (0.01 mole) of 8,9-dihydro - 2 - (p-methoxyphenyl)dibenzo[3,4,7,8]cycloöcta-[1,2-d]imidazole in 40 ml. of absolute methanol is added gaseous hydrogen chloride until the resulting precipitates of the hydrochloride salt ceases to form. The suspension is cooled in ice and the precipitate filtered and dried. An equal volume of diethyl ether is added to the filtrate, resulting in the precipitation of a second crop of the desired hydrochloride salt. The two fractions are combined and recrystallized from ethanol.

In an analogous manner, the compounds of the present invention are converted to their pharmaceutically acceptable acid addition salts.

EXAMPLE XV

Suspension

A suspension of 2-phenyldibenzo[b,f]thiepin[4,5-d]imidazole is prepared with the following composition:

Effective ingredient _____ g-- 100.00
70% aqueous sorbitol _____ g-- 741.29
Glycerine, U.S.P. _____ g-- 185.35
Gum acacia (10% solution) _____ ml-- 100.00
Polyvinylpyrrolidone _____ g-- 0.50
Distilled water, sufficient to make 1 liter.

To this suspension, various sweeteners and flavorants are added to improve the palatability of the suspension. The suspension contains approximately 100 mg. of effective agent per milliliter.

EXAMPLE XVI

Solid dispersion

A solid dispersion containing 20% 2-trifluoromethyl-dibenzo[b,f]thiepin[4,5-d]imidazole and 80% polyethylene glycol 6000 (PEG 6000) is prepared by adding in small portions and with constant stirring 100 g. of the imidazole to 500 g. of PEG 6000 heated to 70° C. When all the compound is added, the melt is "flash cooled" by cooling in an ice bath and the solidified product reduced to a fine powder and passed through a 100 mesh sieve. The material is not passing through is recycled through the melting process.

EXAMPLE XVII

Tablets

A tablet base is prepared by blending the following ingredients in the proportion by weight indicated:

Sucrose, U.S.P. _____ 80.3
Tapioca starch _____ 13.2
Magnesium stearate _____ 6.5

Into this tablet base there is blended sufficient 2-trifluoromethyldibenzo[b,f]thiepin[4,5-d]imidazole to provide tablets containing 20, 100 and 250 mg. of active ingredient per tablet. The compositions are each compressed into tablets, each weighing 360 mg., by conventional means.

EXAMPLE XVIII

Capsules

A blend is prepared containing the following ingredients:

Calcium carbonate, U.S.P. _____ 17.6
Dicalcium phosphate _____ 18.8
Magnesium trisilicate, U.S.P. _____ 5.2
Lactose, U.S.P. _____ 5.2
Potato starch _____ 5.2
Magnesium stearate A _____ 0.8
Magnesium stearate B _____ 0.35

To this blend is added sufficient 8,9-dihydro-2-phenydibenzo[3,4,7,8]cycloöcta[1,2-d]imidazole to provide capsules containing 50, 200 and 400 mg. of active ingredient per capsule. The compositions are filled into conventional hard gelatin capsules in the amount of 500 mg. per capsule.

PREPARATION A (a) 5,6,11,12 - tetrahydrodibenzo[a,e]cycloöctene-5,6-dione

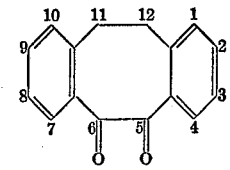

To a suspension of 23.2 g. (0.209 mole) of selenium dioxide in 500 ml. of dry glacial acetic acid, under a nitrogen atmosphere and heated to 80° C., is added dropwise 42.0 g. (0.19 mole) of 5,6,11,12-tetrahydrodibenzo[a,e]cycloöctene-5-one in 250 ml. of the same solvent. The reaction temperature is raised to 110° C. and maintained at this temperature for 5-6 hours. The mixture is cooled, poured slowly into 2500 ml. of ice-water and extracted several times with ethyl acetate. The organic layer is back-washed with a saturated sodium bicarbonate solution and dried over calcium sulfate. The calcium sulfate is filtered and the filtrate evaporated to dryness, leaving a yellow semi-solid, which on recrystallization from ethanol provided the desired product in three crystallization fractions, 3.8 g.) 21.3 g. and 3.5 g.) M.P.'s 130–132° C., 129° C. and 130–131° C., respectively. The three crops are combined and used without further purification.

Leonard et al., J. Am. Chem. Soc., 77, 5078 (1955), reports melting point of 131–132° C. for this material, prepared by a different method.

(b) The following 5,6,11,12-tetrahydrodibenzo[a,e,]cycloöctene-5,6-diones, not previously reported in the chemical literature, are synthesized by the selenium dioxide oxidation of the corresponding monoketone:

thiepin-10-11-diones, not previously known in the literature, are prepared:

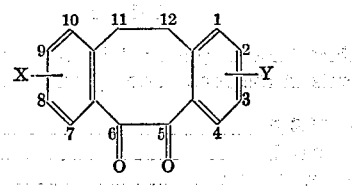

| X | Y | X | Y |
|---|---|---|---|
| H | 1-CH₃ | 7-CH₃ | 3-CH₃ |
| H | 2-CH₃ | 7-CH₃O | 3-CH₃ |
| H | 3-CH₃ | 7-CH₃O | 1-CH₃ |
| H | 4-CH₃ | 8-CH₃O | 1-CH₃ |
| H | 1-CH₃O | 8-CH₃O | 3-F |
| H | 2-CH₃O | 9-CH₃O | 3-F |
| H | 3-CH₃O | 9-CH₃O | 2-F |
| H | 4-CH₃O | 8-CH₃O | 2-F |
| H | 1-F | 7-F | 2-F |
| H | 2-F | 7-F | 2-Cl |
| H | 3-F | 9-F | 2-Cl |
| H | 4-F | 10-F | 2-Cl |
| H | 1-Cl | 7-Cl | 2-Cl |
| H | 2-Cl | 7-Cl | 3-Br |
| H | 3-Cl | 9-Cl | 3-Br |
| H | 4-Cl | 9-Cl | 3-CH₃O |
| H | 1-Br | 10-Br | 3-CH₃O |
| H | 2-Br | 10-Br | 3-CH₃ |
| H | 3-Br | 7-CH₃S | 3-CH₃ |
| H | 4-Br | 7-CH₃S | 1-F |
| H | 1-CH₃S | 7-CH₃ | 1-F |
| H | 2-CH₃S | 7-CH₃ | 3-Cl |
| H | 3-CH₃S | 7-CH₃S | 3-Cl |
| H | 4-CH₃S | 7-CH₃S | 3-CH₃S |
| 10-Br | 3-CH₃S | 9-CH₃O | 1-Br |
| 10-Br | 1-Br | 9-CH₃O | 3-CH₃S |
| 9-F | 1-Br | 9-CH₃O | 1-CH₃O |

PREPARATION B (a) 10,11-dihydrodibenzo[b,f]thiepin-10,11-dione

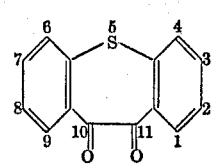

A mixture of 50 mg. (0.22 mmole) of 10,11-dihydrodibenzo[b,f]thiepin-10-one and 27 mg. (0.24 mmole) of selenium dioxide in 15 ml. of dry glacial acetic acid is heated at 80° C. until a solution is effected. The reaction temperature is then raised to 110° C. and maintained for 2 hours. The reaction mixture is filtered, poured into water and extracted with ethyl acetate. The organic layer is concentrated to dryness and the semi-solid triturated with hot benzene. Removal of the benzene provides the desired product as a yellow solid, 38 mg., M.P. 116–126° C. The analytical sample is triturated with diethyl ether, M.P. 120–126° C.

Analysis.—Calcd. for C₁₄H₈O₂S (percent): C, 70.00; H, 3.3. Found (percent): C, 70.0; H, 3.5.

(b) Following the above described oxidation procedure the following substituted 10,11 - dihydrodibenzo[b,f]

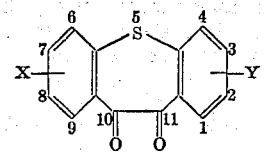

| X | Y | X | Y |
|---|---|---|---|
| H | 1-CH₃ | 6-F | 2-CH₃O |
| H | 2-CH₃ | 9-Cl | 2-CH₃O |
| H | 4-CH₃ | 9-Cl | 1-Cl |
| H | 2-CH₃O | 7-Cl | 1-Cl |
| H | 4-CH₃O | 7-Cl | 2-Cl |
| H | 1-F | 7-Br | 2-Cl |
| H | 3-F | 7-Br | 2-CH₃O |
| H | 2-Cl | 6-Br | 2-CH₃O |
| H | 4-Cl | 6-Br | 4-CH₃ |
| H | 1-Br | 7-CH₃S | 4-CH₃ |
| H | 2-Br | 7-CH₃S | 2-Br |
| H | 3-Br | 6-F | 2-Br |
| H | 2-CH₃S | 6-F | 2-CH₃S |
| H | 3-CH₃S | 8-CH₃ | 2-F |
| H | 4-CH₃S | 8-CH₃ | 2-Cl |
| 9-CH₃ | 1-CH₃ | 9-F | 2-Cl |
| 7-CH₃ | 1-CH₃ | 7-CH₃S | 2-Cl |
| 7-CH₃ | 2-CH₃ | 7-CH₃S | 4-CH₃S |
| 7-CH₃O | 2-CH₃ | 7-CH₃O | 4-CH₃S |
| 7-CH₃O | 2-F | 7-CH₃O | 3-Br |
| 8-F | 2-F | 7-Br | 3-Br |
| 8-F | 2-CH₃O | | |

PREPARATION C 11,12-dihydrocycloöcta[a,e]dibenzen-5(6H)-ones

The following cycloöcta[a,e]dibenzen-5(6H) - ones, previouly unreported in the chemical literature, are prepared according to the procedure as taught by Leonard et al., J. Am. Chem. Soc., 77, 5078 (1955), and comprises cyclization of the appropriate 2-phenylethylphenylacetic acid with polyphosphoric acid at steam bath temperatures for 5–6 hours:

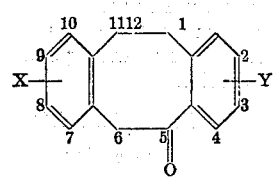

| X | Y | X | Y |
|---|---|---|---|
| H | 1-CH₃ | H | 1-Br |
| H | 2-CH₃ | H | 2-Br |
| H | 3-CH₃ | H | 3-Br |
| H | 4-CH₃ | H | 4-Br |
| H | 1-CH₃O | H | 1-CH₃S |
| H | 2-CH₃O | H | 2-CH₃S |
| H | 3-CH₃O | H | 3-CH₃S |
| H | 4-CH₃O | H | 4-CH₃S |
| H | 1-F | 7-CH₃ | 3-CH₃ |
| H | 2-F | 7-CH₃O | 3-CH₃ |
| H | 3-F | 7-CH₃O | 1-CH₃ |
| H | 4-F | 8-CH₃O | 1-CH₃ |
| H | 1-Cl | 8-CH₃O | 3-F |
| H | 2-Cl | 9-CH₃O | 3-F |
| H | 3-Cl | 9-CH₃O | 2-F |
| H | 4-Cl | 8-CH₃O | 2-F |
| 7-F | 2-F | 9-Cl | 3-CH₃O |
| 7-F | 2-Cl | 10-Br | 3-CH₃O |
| 9-F | 2-Cl | 10-Br | 3-CH₃ |
| 10-F | 2-Cl | 7-CH₃S | 3-CH₃ |
| 7-Cl | 2-Cl | 7-CH₃S | 1-F |
| 7-Cl | 3-Br | 7-CH₃ | 1-F |
| 9-Cl | 3-Br | 7-CH₃ | 3-Cl |
| 7-CH₃S | 3-CH₃S | 7-CH₃S | 3-Cl |
| 10-Br | 3-CH₃S | 9-CH₃O | 1-Br |
| 10-Br | 1-Br | 9-CH₃O | 3-CH₃S |
| 9-F | 1-Br | 9-CH₃O | 1-CH₃O |

PREPARATION D

10,1-dihydrodibenzo[b,f]thiepin-10-ones

Employing the procedure as taught by Jilek et al., Monatsh. Chem., 96, 201 (1965), the following dibenzo-[b,f]thiepin-10-ones are prepared via cyclization of the requisite 2-phenylthiophenylacetic acid using polyphosphoric acid at 125° C. for 1-2 hours:

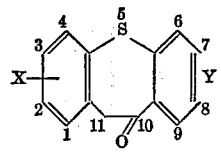

| X | Y | X | Y |
|---|---|---|---|
| H | 9-CH₃ | 4-F | 8-CH₃O |
| H | 8-CH₃ | 1-Cl | 8-CH₃O |
| H | 8-CH₃O | 1-Cl | 9-Cl |
| H | 6-CH₃O | 3-Cl | 9-Cl |
| H | 9-F | 3-Cl | 8-Cl |
| H | 7-F | 3-Br | 8-Cl |
| 3-Br | 8-CH₃O | 4-Br | 8-CH₃O |
| H | 9-Br | 4-Br | 6-CH₃ |
| 3-CH₃S | 6-CH₃ | 3-CH₃S | 8-Br |
| H | 7-Br | 4-F | 8-Br |
| H | 8-CH₃S | 4-F | 8-CH₃S |
| H | 7-CH₃S | 2-CH₃ | 8-F |
| H | 6-CH₃S | 2-CH₃ | 8-Cl |
| 1-CH₃ | 9-CH₃ | 1-F | 8-Cl |
| 3-CH₃ | 9-CH₃ | 3-CH₃S | 8-Cl |
| 3-CH₃ | 8-CH₃ | 3-CH₃S | 6-CH₃S |
| 3-CH₃O | 8-CH₃ | 3-CH₃O | 6-CH₃S |
| 3-CH₃O | 8-F | 3-CH₃O | 7-Br |
| 2-F | 8-F | 3-Br | 7-Br |
| 2-F | 8-CH₃O | | |

PREPARATION E

2-phenylethylphenylacetic acids

The above-mentioned 2-phenylethylphenylacetate acids are synthesized according to the sequence of reactions as taught by Leonard et al., J. Am. Chem. Soc., 77, 5078 (1955), wherein, starting with 2-phenylethylbenzoic acid the following reactions are effected:

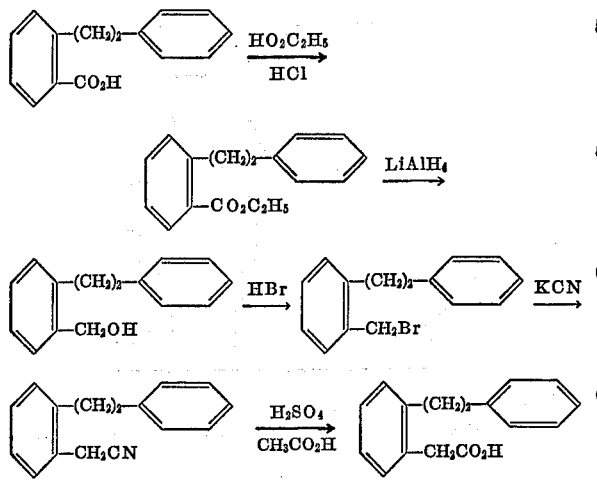

For convenience, the intermediate products are not purified or characterized, but used directly in the next step of the reaction sequence.

Employing the above-described reaction series, and starting with the requisite benzoic acid, the following, previously unreported 2-phenylethylphenylacetic acids, are prepared:

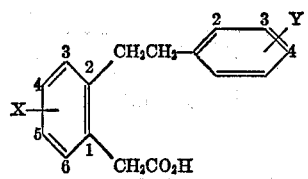

| X | Y | X | Y |
|---|---|---|---|
| H | 2-CH₃ | H | 2-CH₃S |
| H | 3-CH₃ | H | 3-CH₃S |
| H | 4-CH₃ | H | 4-CH₃S |
| H | 2-CH₃O | 6-CH₃ | 4-CH₃ |
| H | 3-CH₃O | 6-CH₃O | 4-CH₃ |
| H | 4-CH₃O | 6-CH₃O | 2-CH₃ |
| H | 2-F | 5-CH₃O | 2-CH₃ |
| H | 3-F | 5-CH₃O | 4-F |
| H | 4-F | 4-CH₃O | 4-F |
| H | 2-Cl | 4-CH₃O | 3-F |
| H | 3-Cl | 5-CH₃O | 3-F |
| H | 4-Cl | 6-F | 3-F |
| H | 2-Br | 6-F | 3-Cl |
| H | 3-Br | 4-F | 3-Cl |
| H | 4-Br | 2-F | 3-Cl |
| 6-Cl | 3-Cl | 6-CH₃ | 4-Cl |
| 6-Cl | 4-Br | 6-CH₃S | 4-Cl |
| 4-Cl | 4-Br | 6-CH₃S | 4-CH₃S |
| 4-Cl | 4-CH₃O | 2-Br | 4-CH₃S |
| 2-Br | 4-CH₃O | 2-Br | 2-Br |
| 2-Br | 4-CH₃ | 4-F | 2-Br |
| 6-CH₃S | 4-CH₃ | 4-CH₃O | 2-Br |
| 6-CH₃S | 2-F | 4-CH₃O | 4-CH₃S |
| 6-CH₃ | 2-F | 4-CH₃O | 2-CH₃O |

PREPARATION F

2-phenylthiophenylacetic acids

The requisite 2-phenylthiophenylacetic acids employed as intermediates leading to the products of the instant invention are prepared by the sequence of reactions as taught by Jilek et al., Monatsh, Chem., 96, 201 (1965) and Protiva et al., Czech. Pat. 121,337 (C.A. 68, 105247t (1968) and comprises conversion of a 2-phenylthiobenzoic acid to the corresponding phenylacetic acid depicted below.

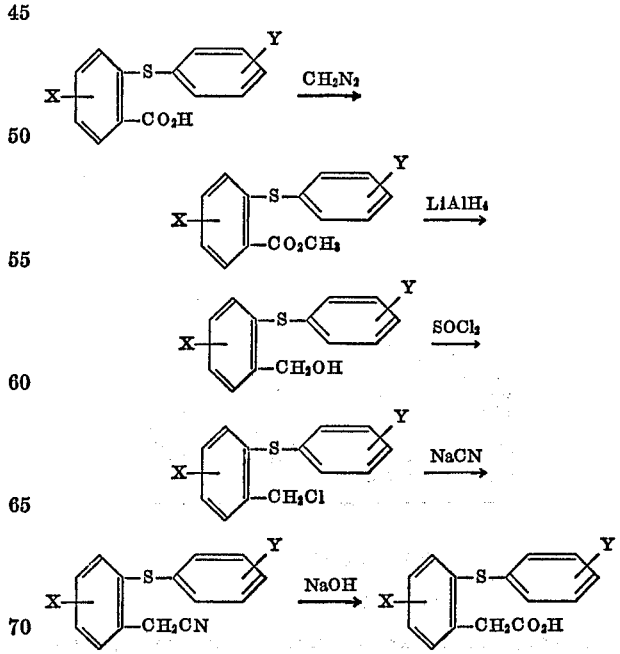

The intermediates are not purified or characterized, but are used directly in the next reaction. In the above-described manner, the following 2-phenylthiophenylacetic acids, not previously described in the chemical literature, are synthesized:

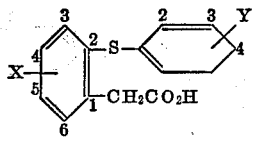

| X | Y | X | Y |
|---|---|---|---|
| H | 3-CH₃ | 3-F | 4-CH₃O |
| H | 4-CH₃ | 6-Cl | 4-CH₃O |
| H | 2-CH₃ | 6-Cl | 3-Cl |
| H | 4-CH₃O | 4-Cl | 3-Cl |
| H | 2-CH₃O | 4-Cl | 4-Cl |
| H | 3-F | 4-Br | 4-Cl |
| H | 4-CH₃S | 4-Br | 4-CH₃O |
| 3-Br | 4-CH₃O | 3-Br | 2-CH₃ |
| H | 3-Br | 4-CH₃S | 2-CH₃ |
| H | 3-CH₃S | 4-CH₃S | 4-Br |
| H | 2-CH₃S | 3-F | 4-Br |
| 6-CH₃ | 3-CH₃ | 3-F | 4-CH₃S |
| 4-CH₃ | 3-CH₃ | 5-CH₃ | 4-F |
| 4-CH₃ | 4-CH₃ | 5-CH₃ | 4-Cl |
| 4-CH₃O | 4-CH₃ | 6-F | 4-Cl |
| 4-CH₃O | 4-F | 4-CH₃S | 4-Cl |
| 5-F | 4-F | 4-CH₃S | 2-CH₃S |
| 5-F | 4-CH₃O | 4-CH₃O | 2-CH₃S |
| 4-CH₃O | 3-Br | 4-Br | 3-Br |

PREPARATION G 2-phenylethylbenzoic acids

The following 2-phenylethylbenzoic acids, not previously reported in the chemical literature, are prepared according to the procedure of Cope et al., J. Am. Chem. Soc., 73, 1676 (1951) and comprises the red phosphorus-hydriodic acid reduction of the corresponding benzalphthalide:

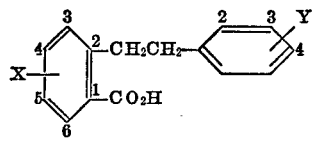

| X | Y | X | Y |
|---|---|---|---|
| H | 2-CH₃ | H | 2-CH₃ |
| H | 3-CH₃ | H | 3-CH₃S |
| H | 4-CH₃ | H | 4-CH₃S |
| H | 2-CH₃O | 6-CH₃ | 4-CH₃ |
| H | 3-CH₃O | 6-CH₃O | 4-CH₃ |
| H | 4-CH₃O | 2-CH₃O | 2-CH₃ |
| H | 3-F | 5-CH₃O | 2-CH₃ |
| H | 4-F | 5-CH₃O | 4-F |
| H | 2-Cl | 4-CH₃O | 4-F |
| H | 3-Cl | 4-CH₃O | 3-F |
| H | 4-Cl | 5-CH₃O | 3-F |
| H | 2-Br | 6-F | 3-F |
| H | 3-Br | 6-F | 3-Cl |
| H | 4-Br | 4-F | 3-Cl |
| 6-Cl | 3-Cl | 3-F | 3-Cl |
| 6-Cl | 4-Br | 6-CH₃S | 2-F |
| 4-Cl | 4-Br | 6-CH₃ | 2-F |
| 6-CH₃S | 4-CH₃S | 6-CH₃ | 4-Cl |
| 3-Br | 4-CH₃S | 6-CH₃ | 4-Cl |
| 3-Br | 2-Br | 4-CH₃O | 2-Br |
| 4-F | 2-Br | 4-CH₃O | 4-CH₃S |
| 4-Cl | 4-CH₃O | 4-CH₃O | 2-CH₃O |
| 3-Br | 4-CH₃O | 3-Br | 4-CH₃ |
| 6-CH₃S | 4-CH₃ | | |

PREPARATION H 2-phenylthiobenzoic acids

The following 2-phenylthiobenzoic acids, previously unreported in the chemical literature, are synthesized from the commercially available or known thiophenols and o-halobenzoic acids according to the method of Protiva et al., Czech. Pat. 121,337 (C.A. 68, 105247t 1968) and Mahishi et al., J. Karnatak Univ., 2, 50 (1957) (C.A. 53, 14101h; 1959).

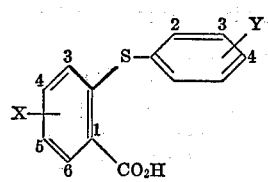

| X | Y | X | Y |
|---|---|---|---|
| H | 3-CH₃ | 3-F | 4-CH₃O |
| H | 4-CH₃ | 6-Cl | 4-CH₃O |
| H | 2-CH₃ | 6-Cl | 3-Cl |
| H | 4-CH₃O | 5-Cl | 3-Cl |
| H | 2-CH₃O | 4-Cl | 4-Cl |
| H | 3-F | 4-Br | 4-Cl |
| 4-Br | 4-CH₃O | 3-Br | 4-CH₃O |
| H | 3-Br | 3-Br | 2-CH₃ |
| H | 4-CH₃S | 4-CH₃S | 2-CH₃ |
| H | 3-CH₃S | 4-CH₃S | 4-Br |
| H | 2-CH₃S | 3-F | 4-Br |
| 6-CH₃ | 3-CH₃ | 3-F | 4-CH₃S |
| 4-CH₃ | 3-CH₃ | 5-CH₃ | 4-F |
| 4-CH₃ | 4-CH₃ | 5-CH₃ | 4-Cl |
| 4-CH₃O | 4-CH₃ | 6-F | 4-Cl |
| 4-CH₃O | 4-F | 4-CH₃S | 4-Cl |
| 5-F | 4-F | 4-CH₃S | 2-CH₃S |
| 5-F | 4-CH₃O | 4-CH₃O | 2-CH₃S |
| 4-CH₃O | 3-Br | 3-Br | 3-Br |

PREPARATION I

Benzalphthalides

Employing the procedures of Weiss, "Organic Syntheses," Coll. Vol. 2, John Wiley & Sons, Inc., New York, N.Y., 1948, page 61, Hrnciar et al., Chem. Zvesti., 21, 267 (1967) (C.A. 67, 73304v; 1967) and Hrnciar, ibid., 16, 96 (1962) (C.A. 59, 2731; 1963), the following benzalphthalides, not previously reported in the literature, are synthesized either via the condensation of the commercially available or known phenylacetic acids and phthalic anhydrides or benzaldehydes and phthalides:

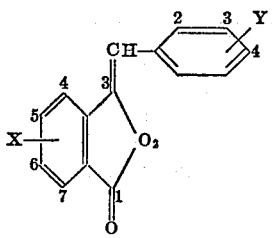

| X | Y | X | Y |
|---|---|---|---|
| H | 2-CH₃S | H | 3-CH₃S |
| 7-CH₃ | 4-CH₃ | 7-Cl | 3-Cl |
| 7-CH₃O | 4-CH₃ | 7-Cl | 4-Br |
| 7-CH₃O | 2-CH₃ | 5-Cl | 4-Br |
| 6-CH₃O | 2-CH₃ | 7-CH₃S | 4-CH₃S |
| 6-CH₃O | 4-F | 4-Br | 4-CH₃S |
| 5-CH₃O | 4-F | 4-Br | 2-Br |
| 5-CH₃O | 3-F | 5-F | 2-Br |
| 6-CH₃O | 3-F | 5-Cl | 4-CH₃O |
| 7-F | 3-F | 4-Br | 4-CH₃O |
| 7-F | 3-Cl | 4-Br | 4-CH₃ |
| 5-F | 3-Cl | 7-CH₃S | 4-CH₃ |
| 4-F | 3-Cl | 7-CH₃S | 2-F |
| 7-CH₃ | 2-F | 7-CH₃ | 4-Cl |
| 7-CH₃S | 4-Cl | 5-CH₃O | 2-Br |
| 5-CH₃O | 4-CH₃S | 5-CH₃O | 2-CH₃O |

What is claimed is:
1. A compound selected from those of the formula:

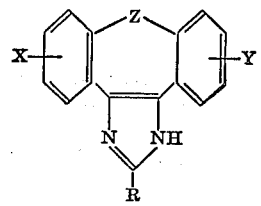

and the pharmaceutically acceptable acid addition salts thereof, wherein:

Z is sulphur;

X and Y are each selected from the group consisting of hydrogen, methyl, methoxy, fluorine, chlorine, bromine, and methylthio; and R is selected from the group consisting of trifluoromethyl, pyridyl, naphthyl and phenyl and substituted phenyl wherein said substituent is selected from the group consisting of methyl, methoxy, fluorine, chlorine, bromine, dimethylamino, carboxy and methylthio.

2. A compound of claim 1 wherein X and Y are each hydrogen.

3. A compound of claim 2 wherein R is p-methoxyphenyl.

4. A compound of claim 2 wherein R is 3-pyridyl.

5. A compound of claim 2 wherein R is trifluoromethyl.

6. A compound of claim 2 wherein R is p-carboxyphenyl.

References Cited

Steck, J. Am. Chem. Soc., vol. 65, pp. 452–56 (1943).

HARRY I. MOATZ, Primary Examiner

U.S. Cl. X.R.

260—327 B, 346.2 R, 465 R, 465 F, 465 G, 469, 470, 473 R, 515, 516, 520, 590; 424—263, 273; 260—309